US009187223B2

(12) United States Patent
Harvey et al.

(10) Patent No.: US 9,187,223 B2
(45) Date of Patent: Nov. 17, 2015

(54) NESTING CONTAINER LIDS WITH SNAP ON WINGS

(71) Applicant: WKI Holding Company, Inc., Rosemont, IL (US)

(72) Inventors: Travis S. Harvey, Chicago, IL (US); Steven M. Grider, West Dundee, IL (US); Justin M. Smyers, Newport Beach, CA (US)

(73) Assignee: WKI HOLDING COMPANY, INC., Rosemont, IL (US)

( * ) Notice: Subject to any disclaimer, the term of this patent is extended or adjusted under 35 U.S.C. 154(b) by 98 days.

(21) Appl. No.: 14/256,142

(22) Filed: Apr. 18, 2014

(65) Prior Publication Data

US 2014/0224821 A1    Aug. 14, 2014

Related U.S. Application Data

(63) Continuation of application No. 13/416,943, filed on Mar. 9, 2012, now Pat. No. 8,733,550.

(51) Int. Cl.
*B65D 21/00* (2006.01)
*B65D 53/02* (2006.01)
(Continued)

(52) U.S. Cl.
CPC ............... *B65D 53/02* (2013.01); *B65D 41/16* (2013.01); *B65D 43/0212* (2013.01); *B65D 45/22* (2013.01); *F16J 15/027* (2013.01); *B65D 2543/00027* (2013.01); *B65D 2543/00194* (2013.01); *B65D 2543/00296* (2013.01); *B65D 2543/00527* (2013.01); *B65D 2543/00537* (2013.01); *B65D 2543/00629* (2013.01);

(Continued)

(58) Field of Classification Search
CPC .... B65D 53/02; B65D 41/16; B65D 43/0212; B65D 45/22; B65D 2543/00027; B65D 2543/00194; B65D 2543/00296; B65D 2543/00527; B65D 2543/00537; B65D 2543/00629; B65D 2543/00731; B65D 2543/00805; B65D 2543/00842; B65D 2543/00972; F16J 15/027
See application file for complete search history.

(56) References Cited

U.S. PATENT DOCUMENTS 498,020 A    5/1893  Murray
771,960 A   10/1904  Adams
(Continued)

FOREIGN PATENT DOCUMENTS

EP    0112295 A2   6/1984
EP    0290418 A2  11/1988
(Continued)

*Primary Examiner* — Anthony Stashick
*Assistant Examiner* — James Way
(74) *Attorney, Agent, or Firm* — McDermott Will & Emery LLP

(57) ABSTRACT

Stackable lids for a container each include a top surface facing generally in a first direction and a bottom surface opposite the top surface and facing generally in a second direction. Pivotable wing portions extend from each side edge of the lid and each pivotable wing portion is joined to its respective side edge by a hinge. The wing portions are moveable between engaged and disengaged positions, and an inner surface of each wing includes a tab member configured for detent engagement with a rim of the container. The lid also includes corner portions extending between the side edges. Each corner portion includes a skirt portion extending generally in the second direction. Each corner portion also defines a recessed shoulder configured to receive the skirt portion of another when the lids are stacked.

3 Claims, 6 Drawing Sheets

(51) Int. Cl.
  *B65D 43/02* (2006.01)
  *B65D 45/22* (2006.01)
  *B65D 41/16* (2006.01)
  *F16J 15/02* (2006.01)

(52) U.S. Cl.
  CPC .............. *B65D2543/00731* (2013.01); *B65D 2543/00805* (2013.01); *B65D 2543/00842* (2013.01); *B65D 2543/00972* (2013.01)

(56) References Cited

U.S. PATENT DOCUMENTS

| | | |
|---|---|---|
| 1,369,969 A | 3/1921 | Fairbanks et al. |
| 1,622,658 A | 3/1927 | McBurney |
| 2,047,720 A | 7/1936 | Wilhelm |
| 2,069,125 A | 11/1936 | Antrim |
| 2,234,485 A | 3/1941 | Connor |
| 2,259,770 A | 10/1941 | Nove |
| 2,447,340 A | 8/1948 | Jackson |
| 2,604,976 A | 7/1952 | Sarg |
| 2,626,726 A | 1/1953 | Burkhardt |
| 2,705,657 A | 4/1955 | DiGiorgio |
| 2,808,175 A | 10/1957 | Aiken |
| 2,898,003 A | 8/1959 | Wilson et al. |
| D192,257 S | 2/1962 | Ebstein |
| 3,081,394 A | 3/1963 | Arel et al. |
| 3,185,371 A | 5/1965 | Reifers |
| 3,273,743 A | 9/1966 | McColl |
| 3,391,847 A | 7/1968 | Christine et al. |
| 3,391,852 A | 7/1968 | Waldrop |
| D218,347 S | 8/1970 | Aubecq |
| 3,632,014 A | 1/1972 | Basile |
| 3,688,942 A | 9/1972 | Mitchell et al. |
| 3,811,747 A | 5/1974 | Levin |
| 3,850,331 A | 11/1974 | Oxel |
| D234,026 S | 12/1974 | Winter |
| 3,964,670 A | 6/1976 | Amneus |
| 4,005,798 A | 2/1977 | Minsky |
| 4,020,969 A | 5/1977 | Ando |
| 4,078,696 A | 3/1978 | Crisci |
| 4,185,752 A | 1/1980 | Basile |
| 4,209,126 A | 6/1980 | Elias |
| D256,759 S | 9/1980 | Johnson |
| D258,038 S | 1/1981 | Johnson |
| D258,350 S | 2/1981 | Scott et al. |
| D259,103 S | 5/1981 | Scott et al. |
| 4,275,815 A | 6/1981 | Davis |
| D261,620 S | 11/1981 | Scott et al. |
| 4,329,919 A | 5/1982 | Andersen |
| D265,798 S | 8/1982 | Ossola |
| 4,466,552 A | 8/1984 | Butterworth et al. |
| D276,218 S | 11/1984 | Baldwin et al. |
| D280,969 S | 10/1985 | Schrage |
| D282,616 S | 2/1986 | Gallagher et al. |
| 4,607,768 A | 8/1986 | Taber et al. |
| D287,559 S | 1/1987 | Daenen et al. |
| D289,844 S | 5/1987 | Daenen et al. |
| D290,346 S | 6/1987 | Siegel |
| D296,525 S | 7/1988 | Siegel |
| 4,863,036 A | 9/1989 | Heijenga |
| 4,976,370 A | 12/1990 | Cassel |
| 4,981,229 A | 1/1991 | Lanham |
| 5,002,189 A | 3/1991 | Sahi |
| 5,065,885 A | 11/1991 | Scaroni |
| D327,201 S | 6/1992 | Gecchelin |
| 5,337,913 A | 8/1994 | Fukuda |
| 5,363,978 A | 11/1994 | Molo |
| 5,405,038 A | 4/1995 | Chuang |
| 5,423,451 A | 6/1995 | Snyder |
| 5,427,266 A | 6/1995 | Yun |
| D361,470 S | 8/1995 | Arbunies |
| D365,251 S | 12/1995 | Lo |
| 5,579,961 A | 12/1996 | Zimmerman |
| 5,641,065 A | 6/1997 | Owens et al. |
| D381,553 S | 7/1997 | Candianides |
| D386,685 S | 11/1997 | Miller |
| 5,688,544 A | 11/1997 | Bolton et al. |
| D389,012 S | 1/1998 | Miller |
| 5,704,485 A | 1/1998 | Cautereels et al. |
| 5,709,318 A | 1/1998 | Oder et al. |
| 5,762,228 A | 6/1998 | Morgan et al. |
| 5,785,201 A | 7/1998 | Bordner et al. |
| 5,806,703 A | 9/1998 | Grandi |
| D401,468 S | 11/1998 | Knoll et al. |
| D407,640 S | 4/1999 | Nelson et al. |
| 5,893,477 A | 4/1999 | Kaneko et al. |
| 5,921,432 A | 7/1999 | Van Berne et al. |
| 5,944,211 A | 8/1999 | Woodnorth et al. |
| D415,386 S | 10/1999 | Stucke, Jr. et al. |
| D415,652 S | 10/1999 | Loew et al. |
| 5,974,686 A | 11/1999 | Nomura et al. |
| D417,367 S | 12/1999 | Laib |
| D417,817 S | 12/1999 | Loew et al. |
| D418,017 S | 12/1999 | Henry |
| 6,035,769 A | 3/2000 | Nomura et al. |
| 6,053,474 A | 4/2000 | Stucke, Jr. et al. |
| D429,961 S | 8/2000 | Harris |
| 6,105,810 A | 8/2000 | Daenen et al. |
| 6,116,151 A | 9/2000 | Fickert et al. |
| D431,419 S | 10/2000 | Greene |
| D435,447 S | 12/2000 | Lee |
| D440,470 S | 4/2001 | Tucker et al. |
| D441,598 S | 5/2001 | Wyche |
| D442,425 S | 5/2001 | Wyche |
| 6,234,067 B1 | 5/2001 | Schmidt |
| D443,184 S | 6/2001 | Maxwell et al. |
| D443,798 S | 6/2001 | Tucker et al. |
| D445,631 S | 7/2001 | Elorza |
| D445,633 S | 7/2001 | Bradley |
| D445,641 S | 7/2001 | Conti |
| D445,649 S | 7/2001 | Maxwell et al. |
| D445,673 S | 7/2001 | Richardson |
| D445,674 S | 7/2001 | Pritchett |
| D445,687 S | 7/2001 | Gilbertson |
| 6,261,616 B1 | 7/2001 | Simpson et al. |
| D446,085 S | 8/2001 | Dretzka |
| D446,117 S | 8/2001 | Conti |
| D448,606 S | 10/2001 | Conti |
| D448,965 S | 10/2001 | Jang-Won |
| D448,969 S | 10/2001 | Conti |
| D450,537 S | 11/2001 | Hayes |
| D452,374 S | 12/2001 | Kim |
| D455,321 S | 4/2002 | Jung et al. |
| 6,364,152 B1 | 4/2002 | Poslinski et al. |
| 6,415,945 B1 | 7/2002 | Zank et al. |
| 6,415,947 B1 | 7/2002 | Kim |
| D461,678 S | 8/2002 | Hayes |
| 6,460,720 B1 | 10/2002 | Massey et al. |
| D465,969 S | 11/2002 | Morin |
| 6,474,490 B1 | 11/2002 | Seibel et al. |
| 6,494,338 B1 | 12/2002 | Schultz |
| D470,005 S | 2/2003 | Cooper et al. |
| 6,557,720 B2 | 5/2003 | Tosdale et al. |
| 6,568,534 B2 | 5/2003 | Zank |
| D475,246 S | 6/2003 | Jørgensen |
| D475,573 S | 6/2003 | Jalet et al. |
| 6,581,795 B1 | 6/2003 | Schulein et al. |
| 6,581,939 B1 | 6/2003 | Theros et al. |
| D477,187 S | 7/2003 | McCallister et al. |
| D478,469 S | 8/2003 | Roth et al. |
| D479,673 S | 9/2003 | Kim |
| D479,954 S | 9/2003 | Kim |
| D480,277 S | 10/2003 | Claypool |
| 6,629,608 B2 | 10/2003 | Hurley et al. |
| D481,910 S | 11/2003 | Kim |
| D483,618 S | 12/2003 | Watson |
| D483,622 S | 12/2003 | Kim |
| D484,367 S | 12/2003 | Kim |
| D484,745 S | 1/2004 | Watson |
| 6,685,046 B2 | 2/2004 | Ogino |
| 6,698,336 B1 | 3/2004 | Siegel et al. |
| D488,031 S | 4/2004 | Kim |
| D490,277 S | 5/2004 | Kim |
| D490,643 S | 6/2004 | Groll |

(56) References Cited

U.S. PATENT DOCUMENTS

| | | |
|---|---|---|
| D493,073 S | 7/2004 | Kim |
| D496,560 S | 9/2004 | Lerner |
| 6,793,096 B1 | 9/2004 | Seok |
| D498,389 S | 11/2004 | Tollman |
| 6,824,004 B1 | 11/2004 | Wooderson |
| D499,931 S | 12/2004 | Kim |
| D500,227 S | 12/2004 | Seok |
| D501,764 S | 2/2005 | Lerner |
| 6,877,633 B2 | 4/2005 | Niese |
| D504,815 S | 5/2005 | Carlson |
| D505,840 S | 6/2005 | Schultz et al. |
| D507,155 S | 7/2005 | Gosen et al. |
| D508,825 S | 8/2005 | Kim |
| 6,929,145 B2 | 8/2005 | Shepler |
| D511,931 S | 11/2005 | Sano |
| D511,938 S | 11/2005 | Watson |
| D512,278 S | 12/2005 | Schultz et al. |
| D514,373 S | 2/2006 | Vendl et al. |
| D514,811 S | 2/2006 | Koo |
| D514,954 S | 2/2006 | Kim |
| D516,376 S | 3/2006 | Kim |
| D517,311 S | 3/2006 | Kim |
| D521,812 S | 5/2006 | Kim |
| D522,804 S | 6/2006 | Vendl et al. |
| D523,296 S | 6/2006 | Kim |
| D524,119 S | 7/2006 | Kim |
| D525,489 S | 7/2006 | Kim |
| 7,077,282 B2 | 7/2006 | Tondar et al. |
| D527,218 S | 8/2006 | Carlson |
| 7,086,326 B2 | 8/2006 | Yokoyama |
| 7,090,089 B2 | 8/2006 | Lown et al. |
| 7,097,067 B2 | 8/2006 | Scarabelli et al. |
| D528,357 S | 9/2006 | Hsu |
| 7,114,617 B2 | 10/2006 | Yewdall et al. |
| 7,131,550 B2 | 11/2006 | Vilalta et al. |
| D535,153 S | 1/2007 | Eide et al. |
| D536,251 S | 2/2007 | Richards |
| D536,571 S | 2/2007 | Kim |
| D537,300 S | 2/2007 | Kim |
| D539,098 S | 3/2007 | Tucker et al. |
| D544,755 S | 6/2007 | Diesman |
| D544,762 S | 6/2007 | Zimmerman |
| D549,519 S | 8/2007 | Moon et al. |
| D551,907 S | 10/2007 | Zettle et al. |
| D553,444 S | 10/2007 | de Groote et al. |
| 7,299,941 B2 | 11/2007 | McMahon, III et al. |
| D559,042 S | 1/2008 | de Groote et al. |
| D562,083 S | 2/2008 | Lown et al. |
| D563,175 S | 3/2008 | Levien |
| D566,483 S | 4/2008 | Tucker et al. |
| D567,029 S | 4/2008 | Valderrama et al. |
| D568,108 S | 5/2008 | Levien |
| D571,657 S | 6/2008 | Kuo |
| D575,115 S | 8/2008 | Zimmerman |
| 7,413,099 B2 | 8/2008 | Takahashi et al. |
| D580,218 S | 11/2008 | Kim |
| D582,201 S | 12/2008 | Kellermann et al. |
| D583,615 S | 12/2008 | Simon et al. |
| D586,179 S | 2/2009 | Furlong |
| D591,112 S | 4/2009 | Wang |
| D591,149 S | 4/2009 | Bonner et al. |
| D594,704 S | 6/2009 | Loaiza |
| D604,157 S | 11/2009 | Reiterer et al. |
| D606,176 S | 12/2009 | Urquiola |
| D606,177 S | 12/2009 | Urquiola |
| D606,813 S | 12/2009 | Kim |
| D607,688 S | 1/2010 | Hart et al. |
| D607,689 S | 1/2010 | Hart et al. |
| D609,530 S | 2/2010 | Hart et al. |
| D610,878 S | 3/2010 | Kim |
| D610,879 S | 3/2010 | Kim |
| D611,305 S | 3/2010 | Hart et al. |
| D612,196 S | 3/2010 | Furlong |
| D615,821 S | 5/2010 | Stamper |
| D618,516 S | 6/2010 | DiPietro et al. |
| 7,740,730 B2 | 6/2010 | Schedl et al. |
| 7,753,223 B2 | 7/2010 | Boozer et al. |
| D621,664 S | 8/2010 | Heiberg et al. |
| 7,784,638 B2 | 8/2010 | Kishbaugh et al. |
| 7,789,262 B2 | 9/2010 | Niederer et al. |
| 7,854,344 B2 | 12/2010 | Suk |
| 7,965,500 B1 | 6/2011 | Bruce et al. |
| 7,975,883 B2 | 7/2011 | Laib et al. |
| D642,861 S | 8/2011 | Samartgis |
| 7,997,439 B2 | 8/2011 | Meeks et al. |
| 2001/0023870 A1 | 9/2001 | Mihalov et al. |
| 2003/0019878 A1 | 1/2003 | Scarabelli et al. |
| 2003/0116572 A1 | 6/2003 | Klock et al. |
| 2003/0160056 A1 | 8/2003 | Moon et al. |
| 2003/0178428 A1 | 9/2003 | Chang |
| 2004/0013827 A1 | 1/2004 | Zuser et al. |
| 2004/0035867 A1 | 2/2004 | Schultz et al. |
| 2004/0182860 A1 | 9/2004 | Wu et al. |
| 2005/0006390 A1 | 1/2005 | Wang |
| 2005/0205572 A1 | 9/2005 | Leibowitz |
| 2005/0205577 A1 | 9/2005 | Park |
| 2005/0218143 A1 | 10/2005 | Niederer et al. |
| 2006/0163265 A1 | 7/2006 | De Candido |
| 2006/0237338 A1 | 10/2006 | Nakamae |
| 2006/0266757 A1 | 11/2006 | Camacho et al. |
| 2007/0095836 A1 | 5/2007 | Auwarter et al. |
| 2007/0095849 A1 | 5/2007 | Kim |
| 2007/0131750 A1 | 6/2007 | Drummond et al. |
| 2007/0164094 A1 | 7/2007 | Takahashi |
| 2007/0164095 A1 | 7/2007 | Schuetz |
| 2007/0170190 A1 | 7/2007 | Milesi et al. |
| 2008/0041852 A1 | 2/2008 | Cai |
| 2008/0083752 A1 | 4/2008 | Mantyla et al. |
| 2008/0203092 A1 | 8/2008 | Stamper et al. |
| 2009/0008284 A1 | 1/2009 | Lown et al. |
| 2009/0039086 A1 | 2/2009 | Auer et al. |
| 2009/0218360 A1 | 9/2009 | Suk |
| 2010/0089934 A1 | 4/2010 | Lim |
| 2011/0180541 A1 | 7/2011 | Becklin |
| 2012/0024856 A1* | 2/2012 | Smyers ............... A47G 19/02 220/324 |
| 2012/0292323 A1* | 11/2012 | Young ............... B65D 43/0262 220/276 |

FOREIGN PATENT DOCUMENTS

| | | |
|---|---|---|
| JP | 11263358 A | 9/1999 |
| JP | 2004307059 A | 11/2004 |
| JP | 2005193980 A | 7/2005 |
| KR | 102005042421 A | 5/2005 |
| KR | 100661905 B1 | 12/2006 |
| KR | 102007099735 A | 10/2007 |
| KR | 200439997 Y1 | 5/2008 |
| KR | 102008043932 A | 5/2008 |
| KR | 102009034619 A | 4/2009 |
| KR | 202009012679 U | 12/2009 |

* cited by examiner

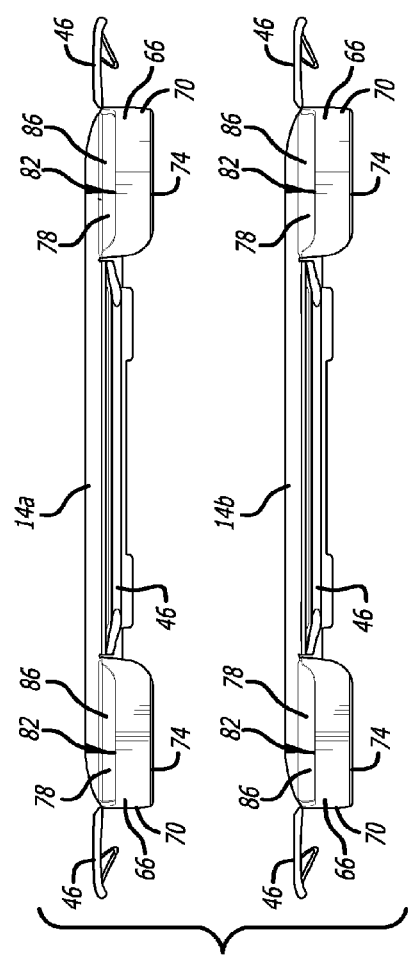
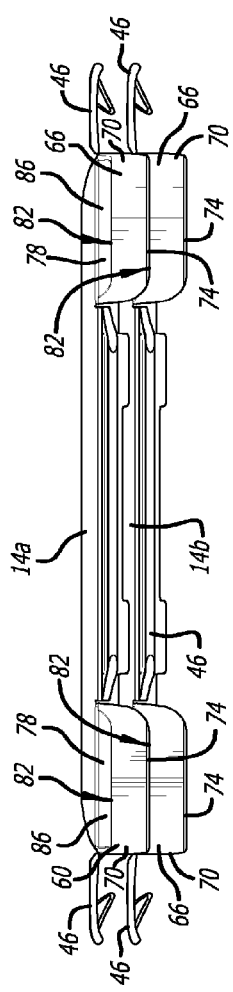

NESTING CONTAINER LIDS WITH SNAP ON WINGS

FIELD OF THE INVENTION

The present invention relates generally to lids for storage containers and more particularly to nesting container lids with snap on wings.

BACKGROUND

A variety of containers and corresponding lids are known for storing items. When the containers in question are intended to store food, such as leftovers, it is generally preferred for the container to include an air tight and leak proof seal. Other considerations for containers intended to store food include the ability to store several containers in a minimum amount of space. In this regard many containers and lids are known with a wide variety of nesting or stacking features that allow the containers and lids to fit within one another, be removably attached to one another, or generally to be stored in a manner that reduces the amount of space occupied by multiple containers and lids. In many instances, there is a design trade-off between providing a strong, air tight seal between the container and corresponding lid and providing nesting or stacking features that allow multiple containers and lids to be stored in a minimum amount of space.

SUMMARY

In some aspects a lid for a container is provided. The container includes a rim and the lid includes a top surface facing generally in a first direction and a bottom surface opposite the top surface and facing generally in a second direction. The lid also includes side edges. A pivotable wing portion extends from each side edge. Each pivotable wing portion is joined to its respective side edge by a hinge and is moveable between a first position where the wing portion extends generally outwardly, and a second position where the wing portion extends generally in the second direction. An inner surface of each wing includes a tab member configured for detent engagement with the rim of the container. The lid also includes corner portions extending between the side edges. Each corner portion includes a skirt portion extending generally in the second direction. Each corner portion also defines a recessed shoulder configured to receive the skirt portion of another, substantially identical, lid.

In other aspects, a pair of lids for a container is provided. The container includes a rim and each lid includes a top surface facing generally in a first direction away from the container when the lid is attached to the container, and a bottom surface opposite the top surface and facing generally in a second direction toward the container when the lid is attached to the container. Each lid also includes side edges. A pivotable wing portion extends from each side edge. Each pivotable wing portion is joined to its respective side edge by a hinge and is moveable between a first position where the wing portion extends generally outwardly, and a second position where the wing portion extends generally in the second direction. An inner surface of each wing includes a tab member configured for detent engagement with the rim of the container. Each lid also includes corner portions extending between the side edges. Each corner portion includes a skirt portion extending generally in the second direction. Each corner portion also defines a recessed shoulder. The lids are stackable upon one another. When a first lid of the pair of lids is stacked upon a second lid of the pair of lids, the recessed shoulders of the second lid each receive a respective one of the skirt portions of the first lid.

In still other aspects, a storage container set includes a container having a base, sidewalls, and a rim, and a plurality of lids. Each lid is releasably attachable to the rim of the container and includes a top surface facing generally in a first direction away from the container when the lid is attached to the container, and a bottom surface opposite the top surface and facing generally in a second direction toward the container when the lid is attached to the container. Each lid also includes side edges. A pivotable wing portion extends from each side edge. Each pivotable wing portion is joined to its respective side edge by a hinge and is moveable between a disengaged first position where the wing portion extends generally outwardly, and an engaged second position where the wing portion extends generally in the second direction. An inner surface of each wing portion includes a tab member configured for detent engagement with the rim of the container. The lid also includes corner portions extending between the side edges. Each corner portion includes a skirt portion extending generally in the second direction, and also defines a recessed shoulder. The lids are stackable upon one another such that when a first lid of the plurality of lids is stacked upon a second lid of the plurality of lids, the recessed shoulders of the second lid each receive a respective one of the skirt portions of the first lid.

In still other aspects, a compressible seal member includes a body defining a cross section. The cross section includes a substantially square and hollow outer portion, an inner portion within the outer portion, and a plurality of webs extending between the inner portion and the outer portion.

In still other aspects, a storage container set includes a container having a base, sidewalls, and a rim. The rim includes rim corners and rim side portions. A lid is releasably attachable to the rim of the container. The lid includes a top surface facing generally in a first direction away from the container when the lid is attached to the container. The lid also includes a bottom surface opposite the top surface and facing generally in a second direction toward the container when the lid is attached to the container. Pivotable wing portions extend along substantially straight side edges of the lid. Each pivotable wing portion is joined to its respective side edge by a hinge and moveable between a disengaged first position and an engaged second position. Corner portions extend between the side edges. Each corner portion includes a skirt portion extending generally in the second direction and covering the rim corners. When the pivotable wing portions are moved to the engaged second position, the pivotable wing portions cover the rim side portions such that the wing portions and the skirt portions cooperate to substantially completely surround and protect the rim of the container.

In still other aspects, a lid for a container includes a top surface facing generally in a first direction, a bottom surface opposite the top surface and facing generally in a second direction, and side edges. A pivotable wing portion extends from one of the side edges and is joined to its respective side edge by a hinge. The pivotable wing portion is moveable between a first position where the wing portion extends generally in an outward direction, and a second position where the wing portion extends generally in the second direction. Hinge guards are located substantially adjacent each end of the hinge. Each hinge guard extends generally in the outward direction beyond the hinge.

BRIEF DESCRIPTION OF THE DRAWINGS

FIG. 6 is a front elevation view of two of the snap-on lids of FIG. 1, one positioned above the other.

FIG. 7 is a front elevation view of two of the snap-on lids of FIG. 1 stacked one upon the other.

Figure 1:
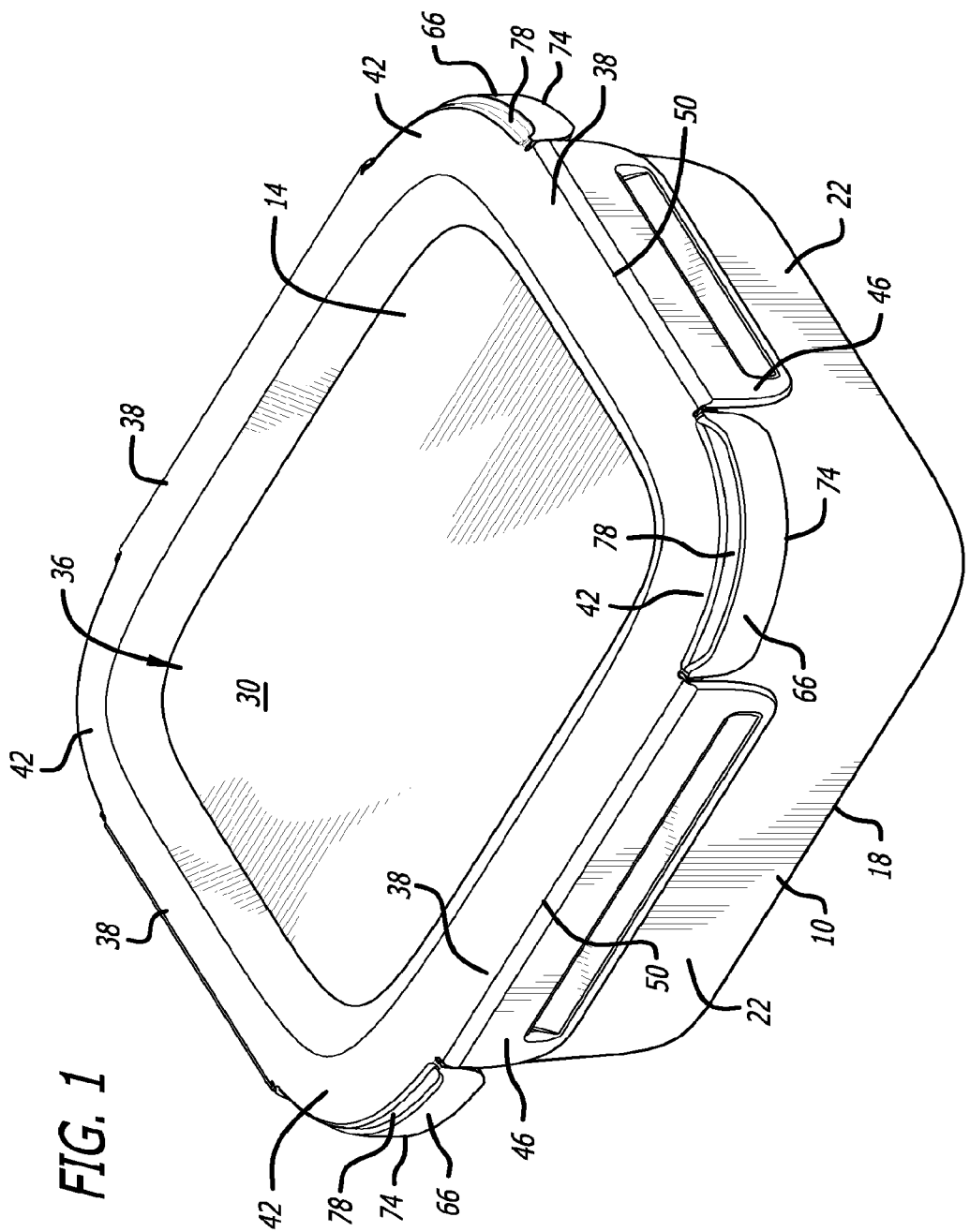
FIG. 1 is a perspective view of a container and a snap-on lid.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

DETAILED DESCRIPTION

FIGS. 1-4 illustrate a container 10 and snap-on lid 14. The container 10 is generally rectangular and includes a base 18, sidewalls 22 extending generally upwardly from the base 18, and a rim 26 (FIG. 4) extending around the upper edges of the sidewalls 22. Containers of different sizes, shapes, and configurations than that illustrated can also be used without departing from the spirit and scope of the present invention. In some embodiments, the container 10 is a substantially rigid material, such as glass, ceramic, and variations thereof.

The snap-on lid 14 is also generally rectangular and is releasably attached to the rim 26 of the container 10. The lid 14 includes a top surface 30 that faces in a first direction generally away from the container 10 when the lid 14 is attached to the container 10, and a bottom surface 34 (FIG. 4) opposite the top surface and that faces in a second direction generally toward the container 10 when the lid 14 is attached to the container 10. The top surface 30 includes a generally concave or recessed portion 36 that is sized to receive the base 18 of another container 10 stacked on top of the lid 14. The recessed portion 36 improves stability when a container 10 is stacked on top of the lid 14.

The lid 14 includes a plurality (e.g., four, as illustrated) of substantially straight side edges 38 and curved corner portions 42 extending between the side edges 38. A pivotable wing portion 46 is joined to and extends from each of the side edges 38. More specifically, each pivotable wing portion 46 is joined to a respective side edge 38 by a hinge 50, such as a living hinge, and is moveable between a disengaged first position in which the wing portion 46 extends generally outwardly (see FIGS. 6 and 7) and an engaged second position (FIGS. 1 and 3) in which the wing portion extends generally in the second direction, e.g., toward the base 18 of the container 10 when the lid 14 is attached to the container 10. In some embodiments, the lid 14 is manufactured from polypropylene.

Figure 4:
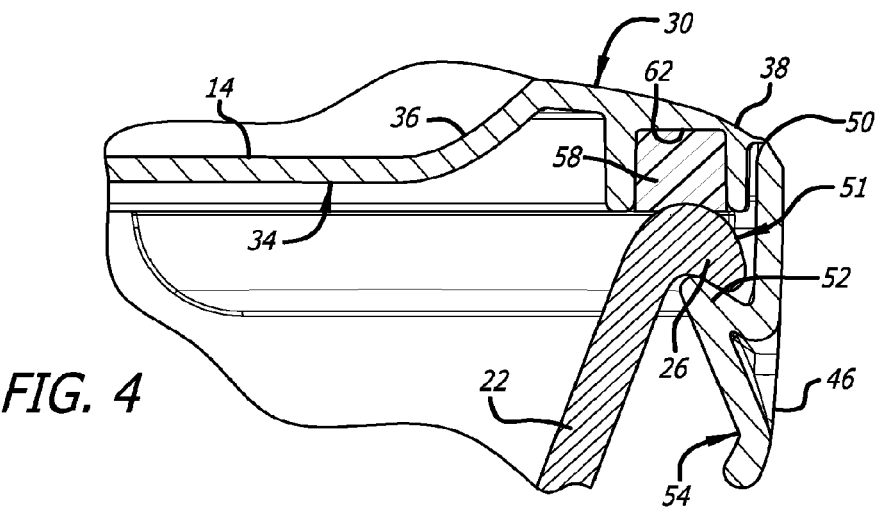
FIG. 4 is a section view taken along line 4-4 of FIG. 2.

FIG. 4 shows the wing portion 46 of the lid 14 in the engaged second position and attached to the rim 26 of the container 10. As shown, the rim 26 is generally hook-shaped in cross section and includes a lower concave surface and an upper convex surface 51. In the illustrated embodiment, the upper convex surface 51 is a smooth, continuously curved surface that extends entirely around the perimeter of the container 10 and defines an uppermost extent of the container 10. The wing portion 46 includes an inner surface 54 that faces toward the upper convex surface 51 of the rim 26 and that includes a tab member 52 for engagement with the lower concave surface of the rim 26. A resilient seal member 58 engages the upper convex surface 51 of the rim 26 to provide a substantially air tight and liquid tight seal between the lid 14 and the container 10. When the wing portion 46 is in the engaged second position, the inner surface 54 is directly adjacent to, but not necessarily touching, the upper convex surface 51 of the rim, and the tab member 52 is in engagement with the lower concave surface of the rim 26.

The seal member 58 is received within a seal channel 62 that is formed in the bottom surface 34 of the lid 14. Both the seal member 58 and the seal channel 62 extend around a perimeter of the lid 14. The combined resiliency of the seal member 58 and the lid 14 permit the tab members 52 of each wing portion 46 to be snapped into and out of the recess defined by the lower concave surface of the rim 26 in a detent manner. In some embodiments, each wing portion 46 includes two tab members 52.

Figure 5:
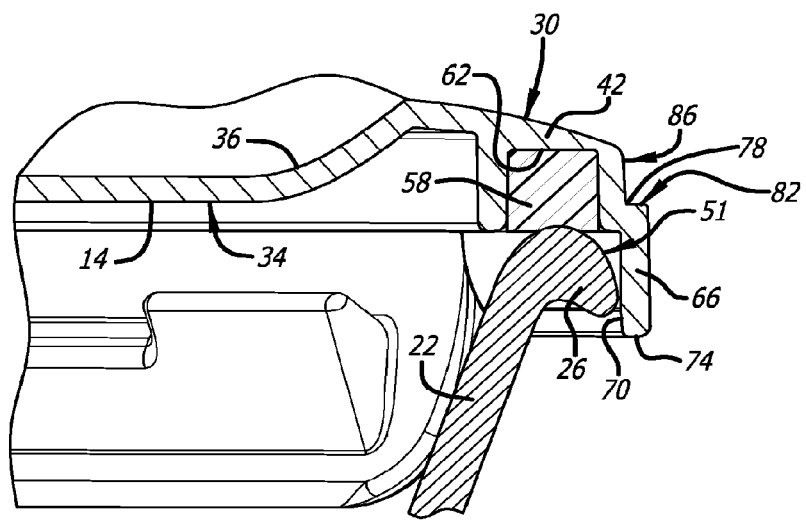
FIG. 5 is a section view taken along line 5-5 of FIG. 2.

Referring also to FIG. 5, in the illustrated embodiment each corner portion 42 of the lid 14 is substantially continuously curved and includes a skirt portion 66 that extends downwardly and around the corners of the container 10 (i.e., generally in the second direction) when the lid 14 is attached to the container 10. Each skirt portion 66 helps properly align the lid 14 with the container 10 as the lid 14 is being positioned on the container 10. Proper alignment of the lid 14 relative to the container 10 ensures that the seal 58 and the wing portions 46 are correctly positioned for engagement with the rim 26 of the container 10.

Each skirt portion 66 includes a lower end 70 terminating in a bottom edge 74. Each corner portion 42 also defines a recessed shoulder 78 formed generally in the area between the top surface 30 and the skirt portion 66. The recessed shoulder 78 is configured to receive the lower end 70 of the skirt portion 66 of another lid 14 when two or more lids 14 are stacked one upon the other. More specifically, the shoulder 78 includes a first shoulder surface 82 that faces in the first direction, and a second shoulder surface 86 that joins the first shoulder surface 82 and faces generally outwardly. In the illustrated embodiment, the second shoulder surface 86 also joins the top surface 30; however, other embodiments may include additional steps, shoulders, or other features between the second shoulder surface 86 and the top surface 30.

Referring also to FIGS. 6 and 7, when a first lid 14a is stacked upon a second lid 14b, the shoulders 78 of the second lid 14b receive the skirt portions 66 of the first lid 14a. More specifically, the bottom edges 74 of the skirt portions 66 of the first lid 14a engage the first shoulder surfaces 82 of the second lid 14b, and the lower ends 70 of the first lid 14a fit over the second shoulder surfaces 86 of the second lid 14b. In some embodiments, with the exception of the wing portions 46, which tend to droop slightly, the only contact between the first lid 14a and the second lid 14b is the contact between the lower ends 70 of the skirt portions 66 of the first lid 14a and the first and second shoulder surfaces 82, 86 of the second lid 14b. This is due at least in part to the height of the skirt portions 66, which is sufficient to space the top and bottom surfaces 30, 34 of adjacent lids apart from one another.

Figure 2:
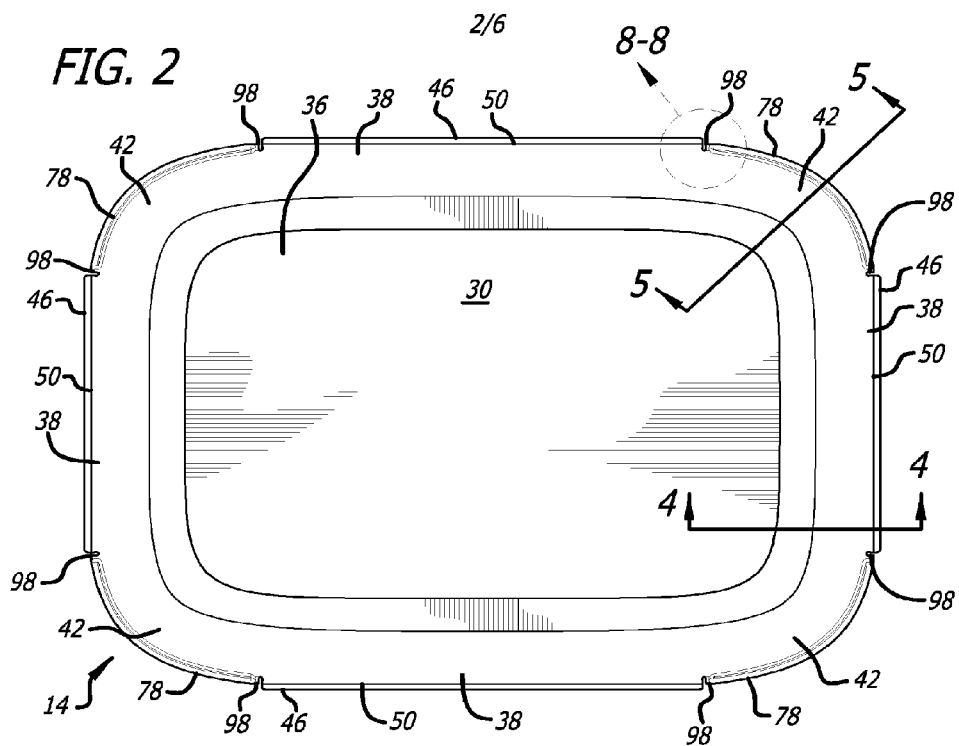
FIG. 2 is a top view of the container and snap-on lid of FIG. 1.
Figure 3:
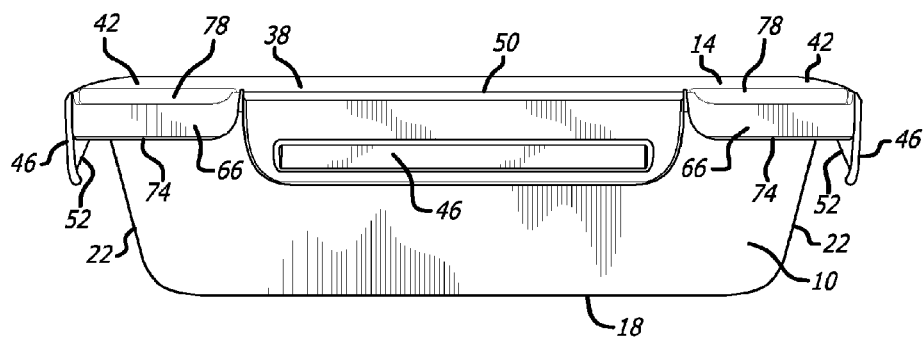
FIG. 3 is front elevation view of the container and snap-on lid of FIG. 1.

As mentioned above, the height of the skirt portions 66 also aids in alignment of the lid 14 with the container 10. More specifically, the skirt portions 66 extend in the second direction well beyond the bottom surface 34 of the lid 14 such that, as the lid 14 is positioned over the container 10, the skirt portions 66 receive and corners of the rim 26 and guide the lid 14 into position. As a result, the seal member 58 is properly aligned with the rim 26 before the wing portions 46 are moved from the disengaged first position to the engaged second position, which compresses the seal 58. As FIG. 6 makes apparent, when the wing portions 46 are in the disengaged first position, the skirt portions 66 substantially completely cover the corners of the rim 26 of the container 10, while the straight side portions of the rim 26 remain substantially exposed when viewed from the front or side. Moving the wing portions 46 to the engaged second position covers the side portions of the rim 26. Once the wing portions 46 are in the engaged second position, the wing portions 46 and the skirt portions 66 cooperate to substantially completely surround and protect the rim 26 of the container. More specifically, as best shown in FIG. 2, only a very small portion of the rim 26 is exposed to the outside by the small spaces between the wing portions 46 and the skirt portions 66.

Figure 8:
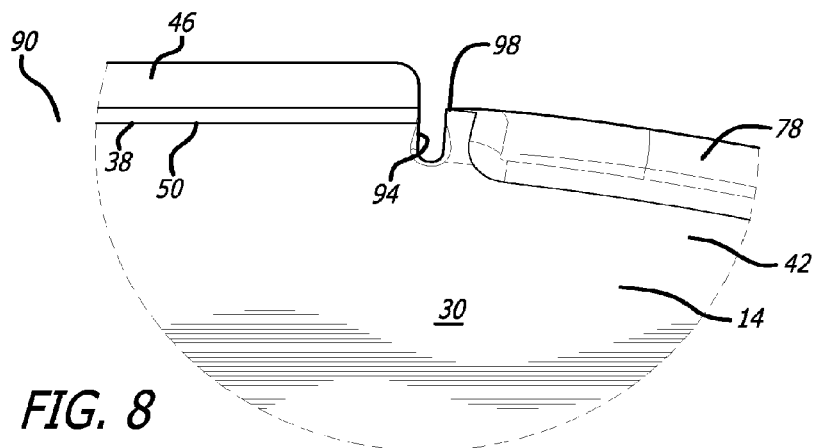
FIG. 8 is an enlarged view showing the encircled portion 8-8 of the container and snap-on lid in FIG. 2.

Referring to FIG. 8, each hinge 50 defines a respective hinge axis 90 about which the wing portion 46 pivots. A relatively small, U-shaped cutout 94 is provided between the end of the hinge 50 and the end of the adjacent corner portion 42. To protect the hinge 50 and improve durability of the lid 14, the end of each corner portion 42 includes a hinge guard 98. The hinge guard 98 is substantially aligned with the hinge 50 to protect the end of the hinge 50 and the wing portion 46 from side impacts, which can contribute to premature failure of the hinge 50. This can particularly be the case when the hinge 50 is in the form of a living hinge. In the illustrated embodiment the hinge guard 98 extends in an outward direction (e.g., upwardly as viewed in FIG. 8) beyond the hinge axis 90 such that the hinge axis 90 extends through the hinge guard 98 and a portion of the hinge guard 98 is located a further distance in the outward direction than the hinge axis 90. In other embodiments, the hinge axis 90 may be substantially coincident with or tangent to the outer-most portion of the hinge guard 98. Also in the illustrated embodiment, the hinge guard 98 is spaced from the end of adjacent hinge 50 in the direction of the hinge axis 90 by the U-shaped cutout 94.

Figure 9A:
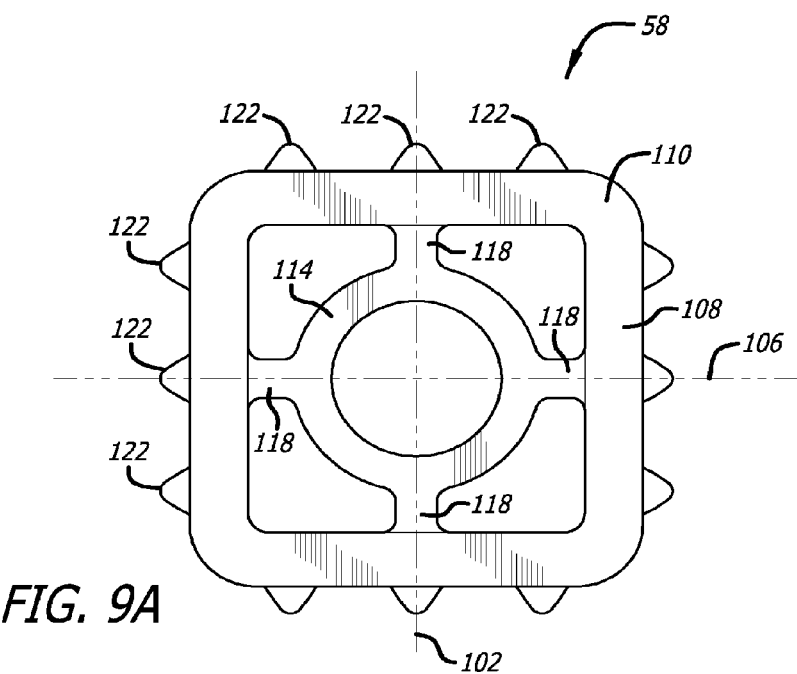
FIG. 9a is a cross-section view of a seal for the snap-on lid of FIG. 1.
Figure 9B:
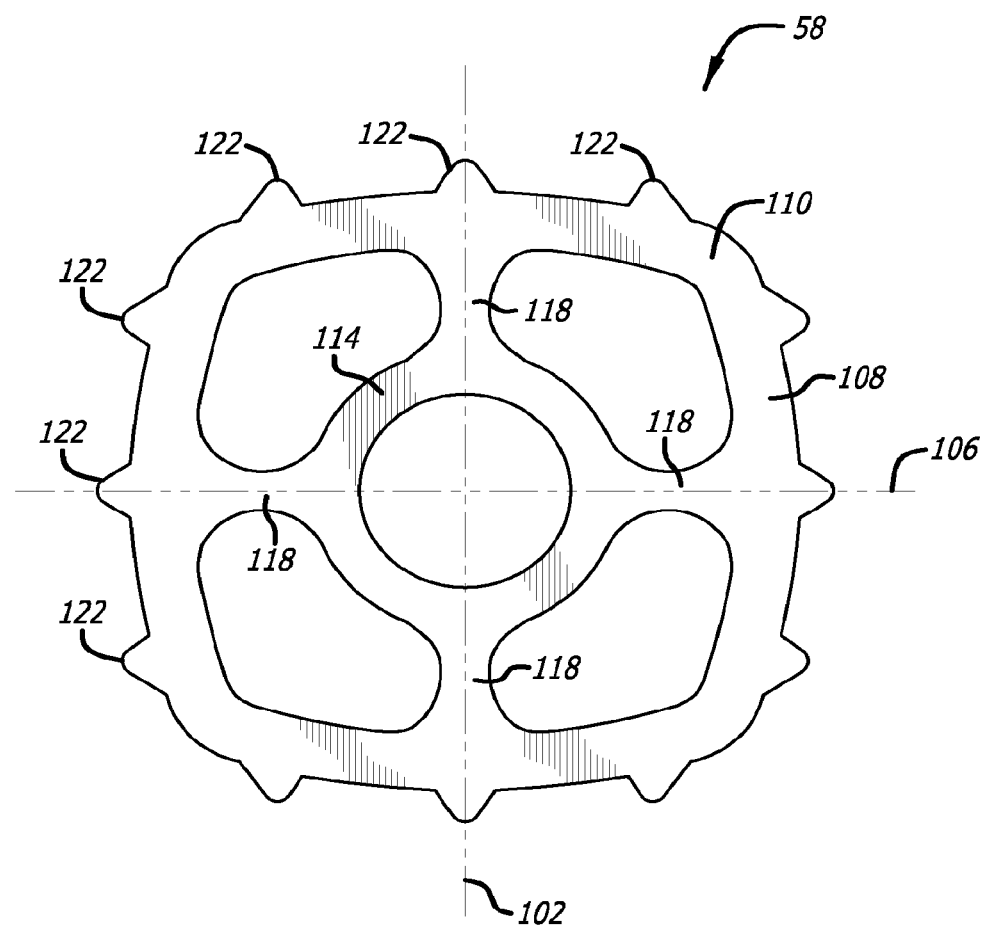
FIG. 9b is a cross-section view of another seal for the snap-on lid of FIG. 1.

Referring to FIGS. 9a and 9b, in some embodiments, the seal member 58 includes a body having a cross section that is symmetrical about both a first axis 102 and a second axis 106 that is substantially perpendicular to the first axis 102. Other embodiments of the seal member 58 may be asymmetrical about one or both of the axes 102, 106. Although other shapes can be used, in the illustrated embodiments, the cross section of the seal member 58 includes outer side walls 108 that define a substantially square hollow outer portion 110, and a substantially circular hollow inner portion 114 positioned within the outer portion 110. The inner portion 114 is coupled to the outer portion 110 by a plurality (e.g., four as illustrated) radially outwardly extending webs 118 that, in the illustrated embodiments, are substantially aligned with the axes 102, 106. More or fewer webs 118 in different arrangements, and thinner or thicker outer and inner portions 110, 114 with different relative sizes and spacings can be selected to provide the desired characteristics of compressibility and resiliency for the seal.

The cross section of the illustrated seal member 58 also includes a plurality (e.g., three, as shown) of raised ridges 122 formed on the outer surface of each side wall 108 of the outer portion 110. As shown, the substantially square hollow outer portion 110 can include substantially straight side walls 108, as in FIG. 9a, or substantially curved or convex side walls 108 as in FIG. 9b. It has been found in some applications that the curved or convex side walls 108 shown in FIG. 9b have a reduced tendency to fold under compression and can sometimes provide a better seal than the straight edges of FIG. 9a. Exemplary materials for the seal member 58 include silicone and thermoplastic elastomer (TPE). The configuration of the seal member 58 results in substantially uniform pressure on all side of the seal member 58 and reduces the possibility of the seal being installed in an improper orientation during assembly.

The invention claimed is:

1. A lid for a container, the container having a rim, the lid comprising:
   a top surface facing generally in a first direction;
   a bottom surface opposite the top surface and facing generally in a second direction;
   side edges, each side edge having a pivotable wing portion extending therefrom, each pivotable wing portion joined to its respective side edge by a hinge and moveable between a first position where the wing portion extends generally outwardly, and a second position where the wing portion extends generally in the second direction, each wing portion including on an inner surface thereof a tab member configured for detent engagement with the rim of the container; and,
   corner portions extending between the side edges, each corner portion including a skirt portion extending, from a first wing around a corner and terminating at an adjacent wing, generally in the second direction, and each corner portion defining a recessed shoulder configured to receive a bottom edge of the skirt portion of a second, substantially identical, lid, such that when stacked, the recessed portion of the corner portion provides a support for the bottom edge of the skirt portion of the second lid.

2. A pair of lids, each lid configured for attachment to a common container, the container including a rim, each lid comprising:
   a top surface facing generally in a first direction away from the container when the lid is attached to the container;
   a bottom surface opposite the top surface and facing generally in a second direction toward the container when the lid is attached to the container;
   side edges, each side edge having a pivotable wing portion extending therefrom, each pivotable wing portion joined to its respective side edge by a hinge and moveable between a disengaged first position where the wing portion extends generally outwardly, and an engaged second position where the wing portion extends generally in the second direction, each wing portion including on an inner surface thereof a tab member configured for detent engagement with the rim of the container; and,
   corner portions extending between the side edges, each corner portion including a skirt portion extending, from a first wing portion around a corner and terminating at an adjacent wing portion, generally in the second direction, and each corner portion defining a recessed shoulder,
   wherein the lids are stackable upon one another, and wherein when a first lid of the pair of lids is stacked upon a second lid of the pair of lids, the recessed shoulders of the second lid each receive a bottom edge of each of a respective one of the skirt portions of the first lid, such that the recessed shoulders of the second lid provide a support for the bottom edge of the skirt of the first lid stacked upon the second lid.

3. A storage container set comprising:

a container having a base, sidewalls, and a rim;

a plurality of lids, each lid releasably attachable to the rim of the container, each lid including:

a top surface facing generally in a first direction away from the container when the lid is attached to the container;

a bottom surface opposite the top surface and facing generally in a second direction toward the container when the lid is attached to the container;

side edges, each side edge having a pivotable wing portion extending therefrom, each pivotable wing portion joined to its respective side edge by a hinge and moveable between a disengaged first position where the wing portion extends generally outwardly, and an engaged second position where the wing portion extends generally in the second direction, each wing portion including on an inner surface thereof a tab member configured for detent engagement with the rim of the container; and, corner portions extending between the side edges, each corner portion including a skirt portion extending, from a first wing portion around a corner and terminating at an adjacent wing portion, generally in the second direction, and each corner portion defining a recessed shoulder, wherein the lids are stackable upon one another, and wherein when a first lid of the plurality of lids is stacked upon a second lid of the plurality of lids, the recessed shoulders of the second lid each receive a bottom edge of a respective one of the skirt portions of the first lid, such that the recessed shoulders of the second lid provide a support for the bottom edge of the skirt portion of the first lid stacked upon the second lid.

* * * * *